United States Patent Office

3,649,483
Patented Mar. 14, 1972

3,649,483
PROCESS FOR PRODUCING BISORGANOMERCURY COMPOUNDS BY THE ELECTROREDUCTION OF SULFONIUM COMPOUNDS
William J. Settineri and Ritchie A. Wessling, Midland, Mich., assignors to The Dow Chemical Company, Midland, Mich.
No Drawing. Filed Dec. 2, 1969, Ser. No. 881,573
Int. Cl. C07b 3/12, 29/06
U.S. Cl. 204—72
7 Claims

ABSTRACT OF THE DISCLOSURE

Bisorganomercury compounds having the structural formula

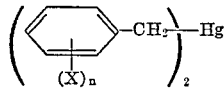

wherein $n$ is an integer of from 0 to 5 and X is an inert, substantially non-interfering substituent, are prepared by subjecting a benzylsulfonium salt in an electrolysis solvent to an electrical potential sufficient to reduce the sulfonium salt; the sulfonium salt has the formula

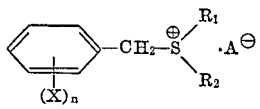

wherein $n$ and X are as defined above, $R_1$ and $R_2$ are alkyl or hydroxyalkyl groups and $A^\ominus$ is an electrolytically acceptable anion. The reduction occurs on a mercury cathode, which is consumed in the reaction. The products are useful as catalysts for free radical initiated polymerizations. In example, dibenzylmercury was prepared by subjecting an aqueous solution of benzyldimethylsulfonium chloride to a cathode potential of about −1.0 volt vs. a saturated calomel electrode.

BACKGROUND OF THE INVENTION

The present invention relates to a novel process for the electrochemical reduction of sulfonium salts to produce bisorganomercury compounds. More particularly, it relates to the electrochemical reduction of a solution of benzyl and substituted benzylsulfonium salts in electrolysis solvents to produce dibenzylmercury and substituted dibenzylmercury compounds.

The preparation of dibenzylmercury by the electrolysis of benzaldehyde in a concentrated sulfuric acid solution is known, as described by T. Arai and T. Oguri, Bull. Chem. Soc., 33, Part 2, 1018 (1960).

The polarography, i.e., the electroreducibility of some sulfonium salts is known, as described for example by Colichman and Love, J. Org. Chem., 18, 40 (1953). However, the synthesis of dibenzylmercury and substituted dibenzylmercury compounds by the electrochemical reductions of benzylsulfonium salts has not been previously described.

SUMMARY OF THE INVENTION

It has now been discovered that solutions of benzylsulfonium salts may be electrochemically reduced in an electrolysis cell having a mercury cathode to prepare dibenzylmercury and substituted dibenzylmercury compounds. The compounds prepared by the process of this invention have the formula (I) 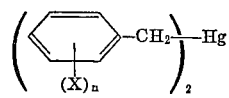

wherein X is an inert, substantially non-interfering group; such as halogen, an alkyl, aryl, alkaryl, aralkyl, alkoxy, aryloxy group or a halo- or hydroxy-substituted such group of from 1 to about 20 carbon atoms, and the like, and $n$ is an integer of from 0 to 5. They are prepared by subjecting a benzylsulfonium salt in an electrolysis solvent to an electrical potential sufficient to reduce the sulfonium salt; the sulfonium salt has the formula (II) 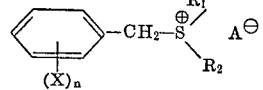

wherein $n$ and X are as defined above, $R_1$ and $R_2$ are alkyl or hydroxy-substituted alkyl groups of from 1 to about 10 carbon atoms and $A^\ominus$ is an electrolytically acceptable anion. The reduction occurs at a mercury cathode which is consumed in the reaction.

The process is conducted in an electrolysis system comprising an anode, a mercury cathode, an electrolysis solvent and a means for applying and maintaining an electrical potential between the anode and cathode. As used herein, the term "electrolysis solvent" refers to water and polar organic compounds which dissolve the sulfonium salt and which are irreducible or not preferentially reduced at the operating cathode potential.

The bisorganomercury compounds defined by I are novel compounds except for those wherein (a) $n$ is 0 or (b) $n$ is 1 and X is o-fluoro, m-fluoro or bromo or p-fluoro, chloro, bromo or methyl.

Each of the novel bisorganomercury compounds may be further reacted with lithium to form a useful anionic polymerization catalyst, such as a catalyst for the polymerization of styrene. Particularly useful in this application are those compounds bearing at least one hydrocarbon substituent of about 4 or more carbon atoms since such compounds are particularly compatible (soluble) with the reaction medium.

The bisorganomercury compounds are good fungicides, herbicides, insecticides and the like, and are particularly effective as fungicides.

Suitable sulfonium salts in the subject process are represented by II above. Preferred sulfonium salts are those wherein (a) $R_1$ and $R_2$ are alkyl or hydroxy-substituted alkyl of from 1 to 4 carbon atoms; the preference being based on the volatility of the $R_1$—S—$R_2$ by-product, or (b) $n$ is at least 1 and at least one X is an alkyl, aryl, etc., group of from about 5 to about 20 carbon atoms. The most preferred sulfonium salts are represented by a combination of (a) and (b). $A^\ominus$ in II is suitably the anion of an organic or inorganic acid, such as benzoate, tosylate, halide, nitrate, bisulfate, etc., or other such anions. The choice of anion is not critical but is advantageously selected so as to increase the solubility of the sulfonium salt in the electrolysis solvent, e.g., the halides are advantageous when the solvent is water and the tosylate is advantageous when the solvent is an organic solvent. Representative examples of suitable sulfonium salts include benzyldimethylsulfonium chloride or bromide,
benzyldiethylsulfonium chloride or bromide,
benzyldi-n-butylsulfonium bisulfate,
benzyldi(2-hydroxyethyl)sulfonium chloride,
benzyldidecylsulfonium fluoride or chloride,
4-chlorobenzyldipropylsulfonium chloride,
4-fluorobenzyldimethylsulfonium chloride,
2,4-dichloro- and 2,4-dibromobenzyldiethylsulfonium bromide,
4-methyl and 2,4-dimethylbenzyldimethylsulfonium fluoride or chloride,
4-t-butylbenzyldiethylsulfonium sulfate,
4-butoxybenzyldi-n-butylsulfonium fluoride or chloride,
4-decyl-, 4-dodecyl-, and 4-octadecylbenzyldi(2-hydroxyethyl)sulfonium chloride,
4-octylbenzyldi-n-decylsulfonium tosylate,
4-(2-hydroxypropyl)benzyldimethylsulfonium fluoride or bromide,
p-phenyl- and p-phenoxybenzyldiethylsulfonium chloride or bromide,
(m-p-tolyl)benzyldimethylsulfonium bromide,
p-(phenethyl)benzyldipropylsulfonium fluoride, bromide or chloride,

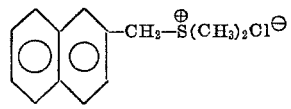

and other like benzylsulfoniums having a fused ring, and other like compounds.

The above and other suitable benzylsulfonium salts may be prepared by any known convenient method, as for example by reacting a benzyl halide with a dialkyl sulfide or a bis(hydroxyalkyl) sulfide in an aqueous medium.

Suitable electrolysis solvents may be any which comply with the above restrictions placed on the solvent; however, water is the preferred solvent. Polar organic solvents, such as tetrahydrofuran, dimethylformamide, dimethylsulfoxide, hexamethylphosphoramide, dioxane, the lower alcohols, such as methanol, ethanol, and isopropanol, mixtures of the above solvents, mixtures of the above organic solvents in water, and the like, may also be used.

An advantage of employing water as the solvent medium is that the supporting electrolytes, when used, are generally readily water-soluble.

The inclusion of a supporting electrolyte is optional in the process, but is advantageous in some instances. Any one of the conventional supporting electrolytes can be used, e.g., the alkali metal salts of strong acids, such as KCl, KBr, NaBr, NaNO$_3$, Na$_2$SO$_4$, and the like, and ammonium salts, such as tetraethylammonium bromide, and the like.

The use of the sulfonium compound as its own supporting electrolyte is particularly advantageous for continuous processes. In a continuous process, as the concentration of the sulfonium compound is reduced due to the preparation of the corresponding dibenzylmercury compound, additional sulfonium compound may be added to the solution in order to maintain the concentration level, or the benzyl halides may be added to react with liberated sulfide thereby forming the sulfonium salts in situ. The concentration of the sulfonium compounds in the solution is desirably maintained between about $10^{-3}$ moles/liter and saturation, with a concentration with from $10^{-2}$ to about 2 moles/liter being preferred. If a supporting electrolyte is used, it is generally added to the electrolysis solution in an amount of from about 0.1 to about 4 moles/liter, preferably from about 0.3 to about 1 mole/liter.

The cathode voltage (reducing voltage) and amperage depend on the particular benzyl sulfonium compound to be reduced. Voltages of from about $-0.5$ to $-1.5$ volts, as measured against a standard calomel electrode, are generally used at from about 1 to about 20 milliamperes/cm.$^2$ of cathode surface.

While the process may be operated at essentially any voltage and amperage within the range sufficient to reduce the sulfonium compound but insufficient to reduce substantial amounts of the electrolysis solvent during the reaction, it is preferred to use controlled-potential electrolysis. In this procedure, a cathode potential (which may be determined by conventional polarographic measurements) selected for the particular sulfonium compound to be reduced is maintained at a constant value for the electrolysis. The technique of controlled-potential electrolysis is explained in detail in Meites, "Controlled-Potential Electrolysis" in A. Weissberger-Ed., Technique of Organic Chemistry, vol. 1, 3rd ed. (Interscience, New York, 1959, pages 3281–3333), the disclosure of which is incorporated by reference herein.

For a typical controlled-potential electrolysis, a three-compartment cell of the type described by Meites is employed. Such a cell was used for the examples set out below. In practice, the cathode compartment and contents are maintained in an inert gas atmosphere, such as argon or nitrogen, during the electrolysis. A direct current is supplied to the electrolysis cell with a variable potential difference between the anode and cathode in order to maintain the potential of the cathode surface at a chosen constant value as the concentration of electrolytes (either sulfonium compound or other supporting electrolyte) changes during the electrolysis. For a typical reduction of a sulfonium salt in which 0.5 normal KCl is used as the supporting electrolyte, the cell resistance is approximately 200 ohms.

In the following examples, the initial sulfonium ion concentration was about $10^{-2}$ moles/liter in a 0.5 normal aqueous KCl solution. The electrolysis cell was charged, purged of oxygen and the paddle wheel stirrer was adjusted for speed and depth of penetration into the mercury surface. A slowly increasing voltage ($V_T$) was applied from the anode to the cathode. The critical or reducing voltage ($V_R$) at the mercury surface was observed with a vacuum tube voltmeter, and it leveled off as the sulfonium ion began to be reduced. If the stirring and sulfonium concentration were high enough, $V_T$ could be further increased, resulting in a higher rate of electrolysis while $V_R$ remained constant. When the sulfonium concentration dropped below a critical value (estimated to be approximately $10^{-3}$ moles/liter), $V_R$ became more negative if $V_T$ was not reduced. Therefore, $V_T$ was progressively lowered as the sulfonium concentration approached 0. Alternatively, additional sulfonium compound or the precursor thereof (which reacts with the sulfide by-product) may be added to the electrolysis solution to maintain the sulfonium compound concentration above its critical value.

DESCRIPTION OF THE PREFERRED EMBODIMENTS

The following examples further describe the invention.

Examples 1–14

Using a controlled-potential electrolysis cell, as described by Meites above, several sulfonium salts were reduced at room temperature on a stirred mercury cathode. A supporting electrolyte was used in each experiment. The results are summarized in Table I.

TABLE I

Sulfonium reactant $$R-\underset{}{\bigcirc}-CH_2-\overset{\oplus}{S}\underset{CH_3}{\overset{CH_3}{\diagup}}\cdot A^{\ominus}$$

| R | $A^{\ominus}$ | Solvent and supporting electrolyte | Cathode potential (volts) | Product | Yield,[1] percent |
|---|---|---|---|---|---|
| H | Cl | $H_2O$; 0.5 N KCl | −1.1 | $(C_6H_5-CH_2)_2-Hg$ | 90 |
| H | $NO_3$ | $H_2O$; 0.5 N $KNO_3$ | −1.3 | Same as above | |
| H | OTos[2] | $H_2O$; 0.5 N KOTos | −1.3 | do | 60 |
| H | OTos | DMF; 0.1 N KOTos | −1.16 | do | 92 |
| Cl | Cl | $H_2O$; 0.5 KCl | −1.1 | $(Cl-C_6H_4-CH_2)_2-Hg$ | 58 |
| Cl | OTos | $H_2O$; 0.5 KCl | −1.16 | Same as above | |
| Cl | OTos | DMF[3]; 0.2 KOTos | −1.0 | do | |
| Br | Br | $H_2O$; 0.5 N KCl | −1.05 | $(Br-C_6H_4-CH_2)_2-Hg$ | --------- |
| Br | OTos | $H_2O$; 0.5 N KCl | −1.2 | Same as above | |
| F | Cl | $H_2O$; 0.5 N KCl | −1.33 | $(F-C_6H_4-CH_2)_2-Hg$ | --------- |
| F | OTos | $H_2O$; 0.5 N KCl | −1.26 | Same as above | |
| $CH_3$ | Cl | $H_2O$; 0.5 N KCl | −1.2 | $(CH_3-C_6H_4-CH_2)_2-Hg$ | 40 |
| $CH_3CH_2-C(CH_3)_2-$ | Cl | $H_2O$; 0.5 N KCl | −0.9 | $(CH_3CH_2C(CH_3)_2-C_6H_4-CH_2)_2-Hg$ | 88 |
| $n-C_{12}H_{25}$ | Cl | $H_2O$; 0.5 N KCl | −1.1 | $(n-C_{12}H_{25}-C_6H_4-CH_2)_2-Hg$ | 55 |
| $C_6H_5$ | Cl | $H_2O$; 0.5 N KCl | −1.0 | $(C_6H_5-C_6H_4CH_2)_2-Hg$ | --------- |

[1] When obtained.  [2] OTos=tosylate anion.  [3] DMF=dimethylformamide.

Examples 15–19: Effect of anion and solvent

Using substantially the same procedure and apparatus as above, various benzyldimethylsulfonium salts in aqueous solutions were reduced to essentially zero concentrations at 25° C. and at 90° C. The anion associated with the sulfonium cation was also varied. In each instance, except one, the supporting electrolyte was 0.5 N aqueous $K^{\oplus}\cdot A^{\ominus}$, wherein $A^{\ominus}$ was the same as the cation in the sulfonium salt. When the solvent was DMF, the concentration of $K^{\oplus}\cdot A^{\ominus}$ was 0.1 N. The results are summarized in Table II.

TABLE II

| | Sulfonium and supporting electrolyte anion | | | | |
|---|---|---|---|---|---|
| | Chloride | Nitrate | Tosylate | | |
| Temperature (° C.) | 25 | 25 | 25 | 25 | 90 |
| Solvent | $H_2O$ | $H_2O$ | $H_2O$ | DMF | $H_2O$ |
| Cathode potential (volts) | −1.3 | −1.3 | −1.3 | −1.16 | −0.92 |
| Polarographic half-wave potentials vs. SCE[1] | −1.23 | −1.24 | −1.23 | | |
| Conc. of sulfonium salt (moles/liter) | 5.01×10⁻² | 5.01×10⁻² | 5.27×10⁻² | 3.46×10⁻² | 2.98×10⁻² |
| Percent yield of products: | | | | | |
| Dibenzylmercury | 11.9 | 8.7 | 60.0 | 91.6 | 94.0 |
| Toluene | 83.2 | 66.3 | 19.3 | | 1.6 |
| Total | 95.1 | 75.0 | 79.3 | 91.6 | 95.6 |

[1] SCE = Saturated Calomel Electrode.

Examples 20–33: Effect of temperature, cathode potential and current density

Using substantially the same procedure and apparatus as above, benzyldimethylsulfonium chloride in aqueous solution ($3.64 \times 10^{-2}$ moles/liter) was electrolyzed to form dibenzylmercury at various temperatures, cathode potentials and current densities. The supporting electrolyte was KCl (0.5 N) in each case. The results are summarized in Table III.

TABLE III

| Reaction Temperature (° C.) | Cathode potential (volts) | Current density [1] | Reaction time (hours) | Yield (percent) |
|---|---|---|---|---|
| 0 | −1.28 | 110 | 8.17 | 7.7 |
| 25 | −1.3 | 260 | | 5.6 |
| 25 | −1.18 | 145 | 5.75 | 17.1 |
| 25 | −1.18 | 90 | | 9.1 |
| 25 | −1.08 | 20 | | 17.7 |
| 50 | −1.20 | 430 | 2.43 | 21.2 |
| 75 | −1.08 | 438 | 1.50 | 58.2 |
| 90 | −1.08 | 500 | | 54.6 |
| 90 | −1.05 | 438 | 1.00 | 67.2 |
| 90 | −0.91 | 100 | | 82.2 |
| 100 | −1.08 | 900 | | 58.7 |
| 100 | −0.88 | 200 | | 82.0 |

[1] Current Density=milliamperes/50 cm.²—initial reading.

At a given temperature the more positive reducing voltages give larger yields of dibenzoylmercury.

Examples 34–36

Using the general procedure set forth in Example 1, bis (2,4 - dichlorobenzyl)mercury, bis(3 - methylbenzyl)mercury and bis(4-(4-methylphenoxy)benzyl)mercury were prepared.

Each of the above mercury compounds are useful as fungicides when used at concentrations up to about 500 p.p.m. in a suitable solvent or carrier, such as water, ethanol-water, etc. For example, bis(2,4-dichlorobenzyl) mercury used at 500 p.p.m. killed the Southern army worm, Downey mildew, *Staphylococcus aureus*, *Bacillus subtilis*, and the like. Similar results were obtained using bis(p-bromobenzyl)mercury and bis(p-phenylbenzyl)mercury, the latter being even more effective in some instances. Bis(p-fluorobenzyl)mercury was likewise useful as a fungicide and additionally killed Chlorella algae, spiny clotbur, beans and the like at herbicidal concentrations, e.g. 1–10 p.p.m., and also killed Yellow fever mosquito larvae, two-spotted spider mite, spotted cucumber beetle and the like. Similar results are obtained by using other bisorganomercury compounds described herein.

We claim:
1. A process for preparing a bisorganomercury compound of the formula

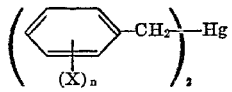

wherein $n$ is an integer of from 0 to 5 and X is an inert, substantially non-interfering group, said process comprising subjecting a benzylsulfonium salt in an electrolysis solvent to an electrical potential sufficient to reduce said sulfonium salt and recovering the product; said salt having the formula

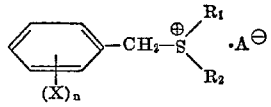

wherein $n$ and X have the aforesaid meaning, $R_1$ and $R_2$ are alkyl or hydroxy-alkyl groups of from 1 to 10 carbon atoms and $A^\ominus$ is an electrolytically acceptable anion; said process being conducted in an electrolysis system comprising an anode, a mercury cathode, an electrolysis solvent and a means for applying and maintaining an electrical potential between said anode and cathode.

2. The process defined in claim 1 wherein X is fluoro, chloro, bromo, or an alkyl, aryl, alkaryl, aralkyl, alkoxy or aryloxy group or a halo- or hydroxy-substituted such group of from 1 to 20 carbon atoms.

3. The process defined in claim 2 wherein $R_1$ and $R_2$ have 1 to 4 carbon atoms.

4. The process defined in claim 1 wherein $n$ is at least 1 and at least one X is a group of from 5 to 20 carbon atoms.

5. The process defined in claim 4 wherein $R_1$ and $R_2$ have from 1 to 4 carbon atoms.

6. The process defined in claim 1 wherein said electrolysis solvent is water.

7. The process of claim 1 wherein the cathode potential is maintained at a substantially constant value.

References Cited

UNITED STATES PATENTS 3,480,525  11/1969  Wessling et al. _____ 204—59
3,480,527  11/1969  Wessling et al. _____ 204—73

F. C. EDMUNDSON, Primary Examiner

U.S. Cl. X.R.

260—433